July 25, 1939.  R. DÖME ET AL  2,167,295

DRIVING GEAR OF MOTOR CARS

Filed Dec. 2, 1937

INVENTORS
R. Döme and
P. Jaross

BY
E. F. Wenderoth
ATTORNEY

Patented July 25, 1939

2,167,295

UNITED STATES PATENT OFFICE 2,167,295

DRIVING GEAR OF MOTOR CARS

Robert Döme and Paul Jaross, Budapest, Hungary

Application December 2, 1937, Serial No. 177,809

1 Claim. (Cl. 64—15)

It has been proposed to provide coil springs as joints into the swinging shafts of motor cars. The shaft ends coupled by the coil spring joint must be supported in a manner to hinder a parallel displacement of the swinging shaft in order to prevent detrimental stresses of the coil spring. This supporting has been provided in the known coil spring joints of the said type in the inner of the spring coil. As, however, the support has to revolve with the shaft and at the same time must allow an angular displacement of the swinging shaft, the support could be designed only as a ball and socket bearing. The object of the spring joint is to balance the shocks occurring on changes of speed or torque and to cause the driven shaft with uniform and not with periodically alternating angular speed, as it is the case with the usual universal joints. This, however, can be reached only if the changes of length of the coil spring are allowed. Hence, the supporting joint had to be designed as a sliding ball and socket joint. The space available in the inner of the spring coil is, however, very restricted so that it is very difficult to locate therein a sliding ball and socket joint meeting in long run the requirements under the stresses to which it is subjected in the tail shaft or in the lone axles of a motor car.

According to the invention this drawback is avoided by supporting both ends of the coil spring by means of pins provided thereon, one of which at least is connected by means of an expansion coupling with the respective shaft, said pins being journalled in bearings located respectively in supporting members embracing the coil spring externally and linked to each other by means of pins the axis of which crosses the resilient section of the coil spring at the point of intersection of the shafts coupled by means of the spring joint.

The annexed drawing shows two samples of the driving gear according to the invention.

Figure 1:
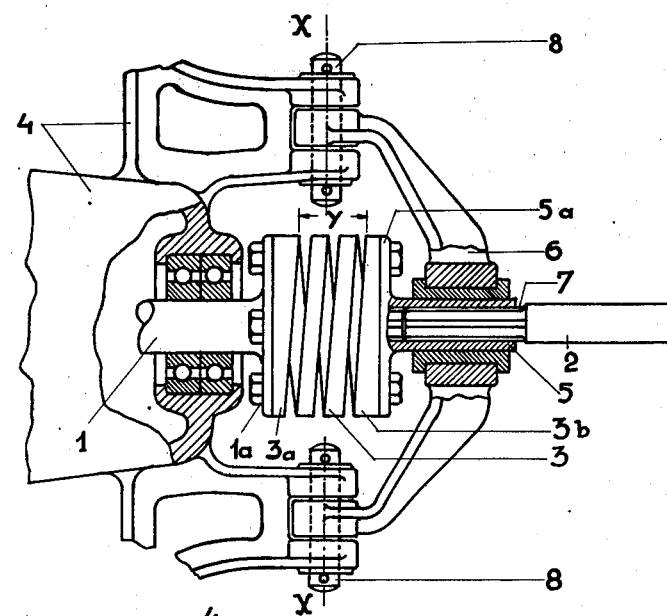
Figure 2:
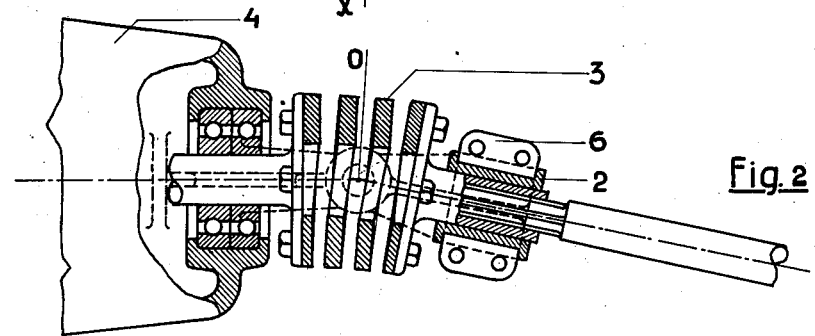
Figure 3:
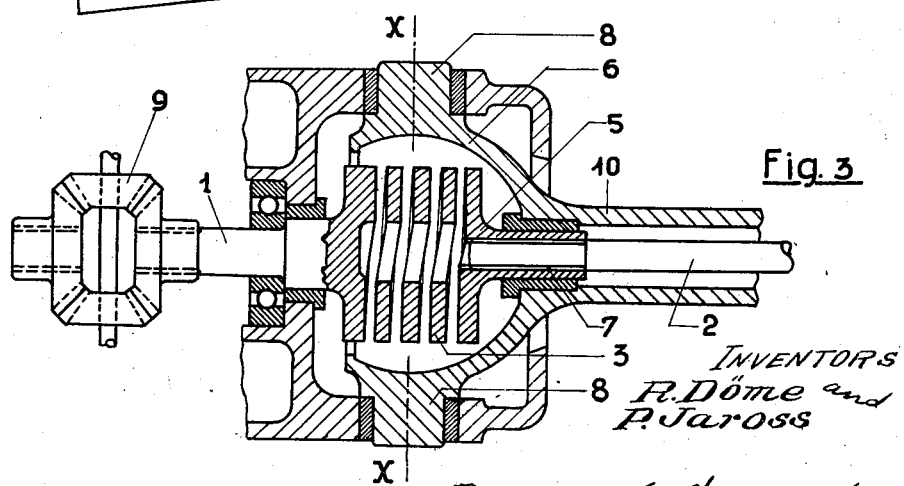

Figs. 1 and 2 show a plan view and a sectional elevation of a driving gear for the tail shaft of a motor car, while Fig. 3 is a horizontal section of a driving gear for a swinging lone axle of a motor car.

With reference to the drawing: 3 is a coil spring the end-flange 3a of which is secured by means of screws to the end-flange 1a of the end-pin 1 of the main shaft of the gear box of a motor car. Said end pin 1 is journalled in the supporting member 4. The other end-flange 3b of the coil spring is secured to the flange 5a of a hollow pin 5 journalled in another supporting member 6. The end of the tail shaft 2 of the motor car extends into the hollow pin 5 and engages it by means of an expansion coupling consisting of longitudinal ribs 7 on one part engaging keyways of the other part in order to allow for the changes of length of the spring coil.

The supporting for the spring joint is provided, according to the invention, by journalling both end-pins 1 and 5 of the spring in supporting members 4 and 6 respectively, which embrace said spring externally and by linking said supporting members to each other by means of pins 8, 8 the axis $x—x$ of which crosses the spring within its resilient section $y$ at the point of intersection $o$ of the shafts coupled by the spring, if the shafts are under an angle (Fig. 2).

According to Fig. 3 the coil spring 3 is located between a differential gear 9 and the lone axle connecting said gear with a driving wheel (not shown in the drawing) mounted on a hinged tubular swinging axle 10 enclosing said shaft. The supporting member 6 on the end of said swinging axle is shaped as a bell enclosing the spring 3 and comprises the journal for the end pin 2, while the other supporting member 5 comprising the journal for the end-pin 1 forms a casing which encloses the said bell 6.

What we claim is:

In a driving gear for motor cars, a driving shaft, a hinged driven shaft, allowed to swing with respect to said driving shaft, a coil spring coupled to said shafts and mounted to permit changes of length of said coil spring, an expansion coupling at least between one end of said spring and the respective shaft, journals on the ends of said shafts adjacent to the said spring and supporting members comprising said journals embracing said spring externally and linked to each other by means of pins, the axis of which crosses the resilient section of said spring at the point of intersection of the driving shaft and the driven shaft when under angle with respect to the former.

ROBERT DÖME.
PAUL JAROSS.